Nov. 12, 1974  JEAN MARC LALANCETTE  3,847,963
METHANATION PROCESSES
Filed Feb. 1, 1973
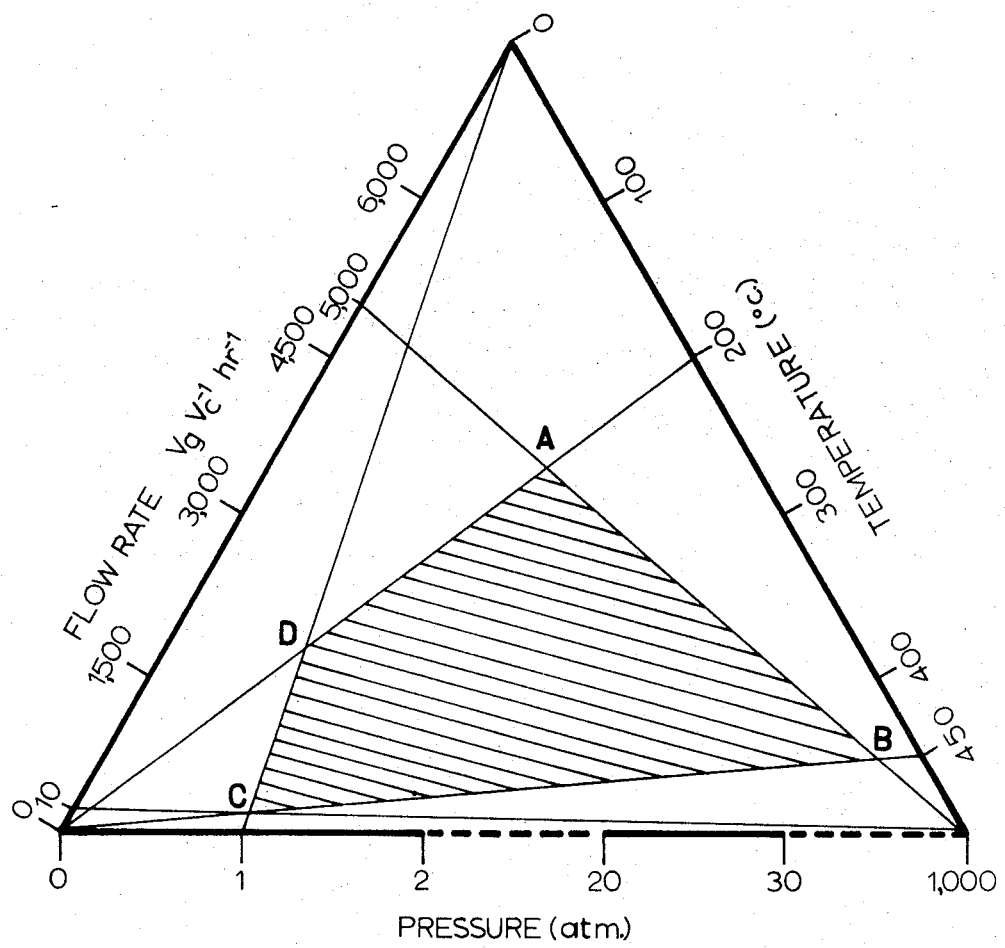

3,847,963
METHANATION PROCESSES
Jean-Marc Lalancette, Sherbrooke, Quebec, Canada, assignor to Ventron Corporation, Beverly, Mass.
Filed Feb. 1, 1973, Ser. No. 328,723
Int. Cl. C07c 27/06
U.S. Cl. 260—449 M           11 Claims

ABSTRACT OF THE DISCLOSURE

There is disclosed a single stage process for the production of methane containing less than 0.1% of carbon monoxide. The process comprises reducing a carbon oxide using a transition metal catalyst intercalated in graphite wherein the transition metal is in the metallic state having a zero valence. The amount of metal in the graphite may vary between 1 to 30% by weight. The reduction is carried out at a temperature range of from 200 to 450° C. with the flow rate of the gaseous mixture of hydrogen and carbon oxide of from 10 to 5000 $V_g V_c^{-1}$ hr.$^{-1}$.

---

The present invention relates to a single stage process for the production of methane gas substantially devoid of any carbon oxide by catalytic reaction of hydrogen and a carbon oxide.

BACKGROUND OF THE INVENTION

It is known that the reduction of carbon monoxide and/or carbon dioxide can produce methane gas in accordance with the following equations:

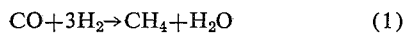
$$CO + 3H_2 \rightarrow CH_4 + H_2O \qquad (1)$$

$$CO_2 + 4H_2 \rightarrow CH_4 + 2H_2O \qquad (2)$$

Reaction 2 is more difficult, carbon monoxide being produced as intermediate in accordance with the following reaction:

$$CO_2 + H_2 \rightarrow CO + H_2O \qquad (3)$$

The reduction is carried out in the presence of a hydrogenation catalyst.

This reduction is carried out in the presence of a transition metal catalyst such as platinum, palladium or nickel. A widely used reduction catalyst is Raney nickel. Normally this type of catalyst is either in finely divided form or is supported or coated on an appropriate solid material. This type of catalyst is suitable for use at pressure varying between atmospheric pressure up to about 1000 atmospheres and at temperatures ranging from −50 to 500° C.

An undesirable feature of transition metal catalysts is that they are easily poisoned with sulfur containing compounds such as sulphydric acid (H$_2$S) even in very low amounts such as 0.3% which is sufficient to cause a noticeable reduction of the activity of the catalyst, whereas higher amounts such as 5% will cause an irreversible poisoning of the catalyst. Accordingly in order to obtain a suitable methanation reaction, precautions must be taken to have gases which are devoid of catalyst-poisoning substances, thus increasing substantially the cost of preparing methane.

It is also known that in such a methanation reaction it is impossible to obtain methane which does not contain a small amount of a carbon oxide which is most undesirable because of the difficulty in separating a mixture of methane and a carbon oxide or side reactions induced in subsequent processes by such impurities. Furthermore any carbon monoxide in admixture with methane is highly undesirable because of the high toxicity of the former in the event leaks occur either in containers or in supply lines.

THE INVENTION

In accordance with the present invention there is now provided an improved process for the production of methane substantially devoid of any carbon oxide by the catalytic reduction of carbon monoxide or carbon dioxide or a mixture of both. The catalytic reduction is carried out in the presence of a transition metal such as nickel, palladium or platinum intercalated in a structural graphite, whereby the transition metal is in the metallic state having a zero valence. In this state, the transition metal has been found to possess greatly improved catalytic properties over those possessed by the same metal whether in a particularly finely divided state such as in Raney nickel or the same metal when deposited or coated on a support such as a carbon support. It has been found that the methane produced in accordance with the present invention contains no detectable amount of any carbon oxide, that is less than 0.1% by volume of carbon monoxide or carbon dioxide.

The process of the present invention comprises circulating a mixture of hydrogen and carbon monoxide and/or carbon dioxide over a transition metal catalyst intercalated in a graphite structure wherein the metal is in the metallic state having a zero valence, the reaction being carried out at a pressure as low as one atmosphere, a temperature range of from 200° to 450° C. and the gas mixture is circulated at a flow rate of from 10 to 5000 $V_g V_c^{-1}$ hr.$^{-1}$ wherein $V_g$ is the volume of the gas mixture and $V_c$ is the volume of the catalyst.

As can be appreciated three variables (temperature, pressure and flow rate) have to be adjusted in order to obtain complete reduction of the carbon monoxide and/or carbon dioxide. As far as the temperature is concerned the minimum range has been determined by the thermal stability of the transient metal carbonyl formed which is unstable at 200° C. For example, when nickel is used as a catalyst, temperature lower than 200° C. will cause some nickel carbonyl Ni(CO)$_5$ to be formed and extracted from the graphite whereas in the range of 200° C. or more the nickel carbonyl formed is instantly decomposed. The higher limit of the temperature range is determined by the thermal stability of methane. In the presence of a metal such as nickel, methane starts to decompose to ethylene, carbon and hydrogen at a temperature of about 450° C.

In order to effect the reduction, a pressure as low as 1 atmosphere can be used with the upper limit being determined by the resistance of the material of the reduction apparatus. As can be appreciated most prior art methanation processes are carried out at pressures usually in the range of 30–50 atmosphere, thereby requiring an expense of energy to operate at such high pressure while requiring correspondingly strong built methanation chambers. As far as the flow rate is concerned a minimum flow rate of 10 $V_g V_c^{-1}$ hr.$^{-1}$ may be used with the upper limit being 5000 $V_g V_c^{-1}$ hr.$^{-1}$.

A preferred set of operating conditions would be a flow rate of 3000 to 4000 $V_g V_c^{-1}$ hr.$^{-1}$, a temperature range 275–350 with a pressure 2–4 atmospheres.

As is apparent from the accompanying diagram, the critical factors in exercising the present invention are the temperature, the pressure and the flow rate. The process is operable in the area defined on the triaxial diagram by the solid lines AB, BC, CD and DA. Each of the points represents the approximate limits of each factors, the ordinate for the pressure setting the lower limit at one atmosphere, for the practical application of this process any higher pressure to 1000 atmospheres being suitable.

The carbon oxide which is subjected to hydrogenation can be obtained from a source of bottled carbon monoxide, carbon dioxide or a mixture of both, which is mixed with hydrogen before reduction. The gas mixture can also be derived from a conventional water gas process wherein coal and steam are caused to react by the water gas reaction to produce water gas which is an equimolar mixture of hydrogen and carbon monoxide as follows:

$$C + H_2O \rightarrow CO + H_2$$

The percentage of hydrogen can be increased by adding pure hydrogen for example such as is obtained by hydrocarbon pyrolysis or by adding steam and passing the mixture over a suitable catalyst to yield more hydrogen by the water gas shift reaction as follows:

$$CO + H_2O \rightarrow CO_2 + H_2$$

In this manner virtually all the hydrogen needed to convert the carbon monoxide or carbon dioxide to methane by the hydrogenation method of the present invention can be obtained.

The graphite intercalated transition metal catalyst is prepared as follows. The support used for the intercalation is graphite, sometimes referred to as crystallized carbon graphite wherein degree of graphitization is as high as possible and the carbon atoms are rearranged according to a definite planar alignment typical of the graphite structure. (See Inorganic Chemistry, by T. Moeller, John Wiley, 1954, p. 666.) Unsuitable for the purpose are porous carbons or so called vermicular "graphite" or compressed vermicular "graphite" or expanded "graphite" or amorphous carbon.

The transition metal is intercalated in the graphite structure by mixing purified graphite with a salt of the transition metal, for example, nickel, platinum or palladium chloride, and the mixture heated in a quartz tube in a slow stream of chlorine gas for about 3 to 10 days. There is thereby obtained an intercalated graphite-transition metal salt compound. By treating the transition metal salt compound with an alkali derivative of an aromatic hydrocarbon such as lithium biphenyl or sodium biphenyl, or potassium naphthyl or sodium or potassium phenyl in an organic solvent such as tetrahydrofuran at a low temperature, such as −50° C. under an inert atmosphere such as helium and after reduction removing the excess alkali metal salts formed with methanol and upon filtering and washing, there is obtained graphite having a pure transition metal in the metallic state intercalated within the crystallites of the graphite. Without going into limitative theoretical considerations it is believed that the improved catalytic properties of intercalated metals can be explained by the structure of the graphite which is such that its lattices act as a barrier against the agglomeration of the finely divided transition metal thereby preventing crystal growth of the metallic phase which normally occurs at the reduction stage or when the catalysis is operating at high temperatures. Secondly, it is believed that the lattice of graphite can be assimilated to a structure where $\pi$ electrons can activate the atoms of the metal in creating partial coordination bonding with the metal. For these reasons it is believed that the intercalated metal is much more active as a catalyst when they are intercalated in graphite. The amount of intercalated metal varies between the range of from 1 to 30% by weight. Particularly interesting results have been obtained with 21% by weight of intercalated metal.

Another advantage of the catalyst used in the present invention is that it can still retain a large portion of its activity in the presence of 0.3% of sulfur containing compounds such as sulphydric acid.

It has also been found that when using the intercalated graphite catalyst in accordance with the present invention carbon monoxide is completely reduced to methane even if it contains a certain amount of carbon dioxide which is normally reduced with difficulty to carbon monoxide as is known in prior art reactions. It is also observed that the catalytic activity of the metal catalyst intercalated in graphite is very constant even after one month of continuous use and the range of conversion to methane is the same at the beginning as at the end of the one-month period of treatment.

The present invention will be further understood by referring to the following examples which are given to illustrate rather than limit the scope of the invention.

EXAMPLE I

Preparation of nickel graphite

A mixture of 25 g. of graphite (Fisher, purified) and 25 g. of nickel chloride (Fisher, reagent) was heated at 530° C. in a quartz tube, in a slow stream of chlorine, for three days. The X-ray diffraction pattern showed new peaks at 4.27, 6.41 and 13.6 A. After a further heat treatment of one week, these peaks had markedly increased and were related to the intercalated salt.

After washing and drying, the graphite-nickel chloride was treated by 5 g. of lithium, 50 g. of biphenyl in 400 ml. of anhydrous tetrahydrofuran at −50° C. under helium atmosphere. After allowing overnight contact with good stirring, the excess of lithium biphenyl was treated with methanol and then water. The reaction mixture was filtered in an atmosphere of helium and washed with one litre of tetrahydrofuran, one litre of acetone and one litre of water to eliminate traces of salts and organic products. The reaction product was then dried under vacuum at 140° C. for 24 hours. The Ni content was determined to be then 21% by weight (dimethylglyoxime method).

By proceeding in the same manner but replacing the nickel chloride with palladium chloride or platinum chloride there is obtained a palladium or platinum intercalated graphite.

EXAMPLE II

A steel reactor comprising a tube having a diameter of one-quarter inch and a length of twelve inches was charged with a 5.05 g. nickel intercalated graphite catalyst containing 21% nickel in the metallic state. This nickel-graphite was deposed on the surface of 12.7 g. of Vycor® glass wool simply by stirring the two materials for a few minutes and placed inside the reactor and the reactor containing the catalyst was placed in a Lindberg furnace.

After treating the charge with a slow stream of hydrogen for twenty-four hours at 320° C., a mixture of carbon monoxide (1 vol.), hydrogen (10 vols.) and carbon dioxide (0.1 vol.) prepared from analytically pure gases was circulated over the charge. The pressure was 69 p.s.i.a. (ca. 4.5 atm.), the temperature was maintained at 342° C. and the flow rate of the gas mixture was 2000 Vg Vc$^{-1}$ hr.$^{-1}$. The effluent gas contained a mixture of hydrogen and methane and no detectable amount of carbon monoxide was detected by the vapor phase chromatography (0.1% lower detectable amount). After one month of continuous operation, the composition of the gas from the system was constant. The mixture of hydrogen and methane was separated by condensation of methane in a liquid nitrogen trap.

Similar results were obtained in cases where the amount of nickel intercalated in the graphite was 5%, 10% and where the nickel was substituted with platinum or palladium at a concentration of 4% in each case.

EXAMPLE III

Operating under conditions identical to Example II except that the nickel intercalated catalyst was replaced with nickel deposited on the surface of graphite, it was noted that the formation of methane was very low. The effluent stream contained only about 2% of methane. After a few days of operation the catalyst was then replaced with the nickel intercalated graphite catalyst used in Example II and the methanation continued with the same stock of gas mixture whereby a gas mixture of hydrogen and methane was obtained which was found to contain less than 0.1% of carbon monoxide and carbon dioxide.

EXAMPLE IV

By proceeding in the same manner as in Example II but adjusting the flow rate of the gas mixture to 10 $V_g V_c^{-1}$ hr.$^{-1}$, the formation of methane was identical to Example II.

EXAMPLE V

By following the procedure of Example II and adding 0.3% by volume of sulphydric acid and operating at 320 p.s.i.a., 348° C. with a flow rate of gases of 2100 $V_g V_c^{-1}$ hr.$^{-1}$, the reduction was essentially complete. When the concentration of sulphydric acid was increased to 5% the reduction of the gas mixture did not take place.

EXAMPLES VI–XI

By following the procedure outlined in Example I and using a gas mixture of hydrogen, carbon monoxide and carbon dioxide in a ratio of 10:0.5:0.5 and operating at a temperature of 348° C. but varying the pressure and flow rate the results shown in Table I were obtained.

TABLE I

| Example | Pressure, atmospheres | Flow rate, $V_g V_c^{-1}$ hr.$^{-1}$ | Percent CH$_4$ | CO | CO$_2$ |
|---|---|---|---|---|---|
| VI | 20.9 | 8,400 | 100 | <0.1 | 0 |
| VII | 19.5 | 8,200 | 100 | <0.1 | 0 |
| VIII | 18.9 | 5,000 | 100 | <0.1 | 0 |
| IX | 18.1 | 4,800 | 100 | <0.1 | 0 |
| X | 17.5 | 450 | 100 | <0.1 | 0 |
| XI | 16.4 | 3,400 | 100 | <0.1 | 0 |

A further interesting feature of the present invention is that a very regular and sturdy distribution of the catalyst is obtained when using pure silicon dioxide glass wool as the support for the metal catalyst intercalated in graphite. It should be noted that glass wools other than those obtained from pure silicon dioxide such as glass wools obtained from soft glass or borosilicate glass are not suitable for use at the temperature ranges used in the process of the present invention. As an example of a suitable pure silicon dioxide glass wool there may be mentioned the brand available on the market under the trademark Vycor®, manufactured and sold by Corning Glass Works.

I claim:

1. A single stage process for producing methane substantially devoid of any carbon oxide from a gaseous mixture of hydrogen and at least one carbon oxide which comprises:
   (a) heating said gaseous mixture to a temperature within the range of 200 to 450° C., and
   (b) passing said gaseous mixture at a flow rate of from 10 to 500 $V_g V_c^{-1}$ hr.$^{-1}$ and under a pressure of as low as one atmosphere in contact with a catalyst composition consisting essentially of a transition metal catalyst intercalated within the crystals of a crystallized carbon graphite, the carbon atoms having a definite planar alignment and wherein the transition metal is in the metallic state having a zero valence, and is selected from the group consisting of nickel, palladium and platinum,
thereby to produce methane gas substantially devoid of any carbon oxide.

2. The process of Claim 1, wherein the amount of intercalated metal in the graphite is within the range of from 1 to 30% by weight.

3. The process of Claim 1, wherein the amount of intercalated metal in the graphite is about 21% by weight.

4. The process of Claim 1, wherein a pure silicon dioxide glass wool is used as a support for the catalyst.

5. A process as in Claim 1, where the metal is nickel.

6. A process as in Claim 1, where the metal is platinum.

7. A process as in Claim 1, wheer the metal is palladium.

8. The process of claim 1 wherein the carbon oxide is carbon monoxide and the amount of intercalated metal in the graphite is within the range of 1 to 30% by weight.

9. The process of claim 1 wherein the amount of intercalated metal in the graphite is within the range of from 1 to 30% by weight and the flow rate, pressure and temperature are within the area ABCDA in the drawing.

10. The process of claim 1 wherein the amount of intercalated metal in the graphite is within the range of from 1 to 30% by weight, the flow rate is from 3000 to 4000 $V_g V_c^{-1}$ hr.$^{-1}$, the temperature is 275–350° C. and the pressure is 2 to 4 atmospheres.

11. The process of claim 1 carried out with a gas containing H$_2$S, said H$_2$S being present in an amount of up to 0.3% by volume.

References Cited

UNITED STATES PATENTS

| | | | |
|---|---|---|---|
| 1,084,258 | 1/1914 | Ellis | 252—449 |
| 2,580,068 | 12/1951 | Beekley | 260—449.6 M |
| 2,660,598 | 11/1953 | Heffert | 260—449 M |
| 943,627 | 12/1909 | Elworthy | 260—449 M |
| 2,257,293 | 9/1941 | Dreyfus | 260—449 |
| 2,756,247 | 7/1956 | James et al. | 260—449 R |

FOREIGN PATENTS

| | | | |
|---|---|---|---|
| 121,769 | 7/1966 | Czechoslovakia | 260—449 |

OTHER REFERENCES

Kornus et al., Chem. Abst. *64* (1966), 16689b.
Knepper et al., Chem. Abst. *68* (1968), 108392x.

HOWARD T. MARS, Primary Examiner

U.S. Cl. X.R.

260—449.6; 252—447, 444